US010817061B2

(12) United States Patent
Andrews et al.

(10) Patent No.: US 10,817,061 B2
(45) Date of Patent: *Oct. 27, 2020

(54) MULTI-DIMENSIONAL TRACKPAD

(71) Applicants: JOYSON SAFETY SYSTEMS ACQUISITION LLC, Auburn Hills, MI (US); NextInput, Inc., Mountain View, CA (US)

(72) Inventors: David Andrews, Ortonville, MI (US); Ian Campbell, Smyrna, GA (US); Ryan Diestelhorst, Atlanta, GA (US); Jason Carl Lisseman, Shelby Township, MI (US); Don Metzger, Heber City, UT (US)

(73) Assignees: JOYSON SAFETY SYSTEMS ACQUISITION LLC, Auburn Hills, MI (US); NEXTINPUT, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/119,033

(22) Filed: Aug. 31, 2018

(65) Prior Publication Data
US 2019/0101989 A1    Apr. 4, 2019

Related U.S. Application Data

(63) Continuation of application No. 14/291,845, filed on May 30, 2014, now Pat. No. 10,067,567.
(Continued)

(51) Int. Cl.
*G09G 5/00* (2006.01)
*G06F 3/01* (2006.01)
(Continued)

(52) U.S. Cl.
CPC .............. *G06F 3/016* (2013.01); *B60K 35/00* (2013.01); *B60K 37/06* (2013.01); *B60R 16/023* (2013.01);
(Continued)

(58) Field of Classification Search
CPC ........ G06F 3/016; G06F 3/023; G06F 3/0414; B60K 35/00; B60K 37/06; H03K 17/9625
(Continued)

(56) References Cited

U.S. PATENT DOCUMENTS 4,484,026 A    11/1984   Thornburg
4,540,979 A     9/1985   Gerger et al.
(Continued)

FOREIGN PATENT DOCUMENTS

EP    1607850     12/2005
JP    64-66522     3/1989
(Continued)

OTHER PUBLICATIONS

Office Action dated Nov. 4, 2014, received in connection with JP Application No. 2011-075258. (English Translation Included).
(Continued)

*Primary Examiner* — Abdul-Samad A Adediran
(74) *Attorney, Agent, or Firm* — Meunier Carlin & Curfman LLC

(57) ABSTRACT

A multi-dimensional track pad is described that acts as human-machine interface (HMI). Inputs to the HMI can be made not only using the tradition two-dimensional (X-Y) inputs of a track pad, but also a third dimension, force, and even a fourth dimension, time. Tactile or audible feedback to the inputs can be provided. Methods of using the HMI to control a system are described as well as a track pad system that utilizes the HMI in communication with a processor.

14 Claims, 5 Drawing Sheets

Related U.S. Application Data

(60) Provisional application No. 61/829,065, filed on May 30, 2013.

(51) Int. Cl.

| | | |
|---|---|---|
| *B60K 35/00* | (2006.01) | |
| *G06F 3/041* | (2006.01) | |
| *B60K 37/06* | (2006.01) | |
| *G06F 3/0354* | (2013.01) | |
| *B60R 16/023* | (2006.01) | |
| *B60W 50/16* | (2020.01) | |
| *G06F 3/16* | (2006.01) | |

(52) U.S. Cl.
CPC ......... *B60W 50/16* (2013.01); *G06F 3/03547* (2013.01); *G06F 3/0414* (2013.01); *G06F 3/16* (2013.01); *B60K 2370/111* (2019.05); *B60K 2370/146* (2019.05); *B60K 2370/1446* (2019.05); *B60K 2370/158* (2019.05); *B60K 2370/782* (2019.05)

(58) Field of Classification Search
USPC .......... 340/384.6; 345/173; 701/48; 700/301
See application file for complete search history.

(56) References Cited

U.S. PATENT DOCUMENTS

| | | | |
|---|---|---|---|
| 4,801,771 A | 1/1989 | Mizuguchi et al. | |
| 4,929,934 A | 5/1990 | Ueda et al. | |
| 5,398,962 A | 3/1995 | Kropp | |
| 5,408,873 A | 4/1995 | Schmidt et al. | |
| 5,423,569 A | 6/1995 | Reighard et al. | |
| 5,453,941 A | 9/1995 | Yoshikawa | |
| 5,463,258 A | 10/1995 | Filion et al. | |
| 5,539,259 A | 7/1996 | Filion et al. | |
| 5,793,297 A | 8/1998 | Takeuchi et al. | |
| 5,871,063 A | 2/1999 | Young | |
| 5,914,658 A | 6/1999 | Arakawa | |
| 5,943,044 A | 8/1999 | Martinelli | |
| 5,965,952 A | 10/1999 | Podoloff et al. | |
| 6,067,077 A | 5/2000 | Martin | |
| 6,333,736 B1 | 12/2001 | Sandbach | |
| 6,378,384 B1 | 4/2002 | Atkinson et al. | |
| 6,429,846 B2 | 8/2002 | Rosenberg et al. | |
| 6,501,463 B1 | 12/2002 | Dahley et al. | |
| 6,636,197 B1 | 10/2003 | Goldberg et al. | |
| 6,809,462 B2 | 10/2004 | Pelrine et al. | |
| 6,906,700 B1 | 6/2005 | Armstrong | |
| 6,933,920 B2 | 8/2005 | Lacroix et al. | |
| 7,126,583 B1 | 10/2006 | Breed | |
| 7,136,051 B2 | 11/2006 | Hein et al. | |
| 7,258,026 B2 | 8/2007 | Papakostas et al. | |
| 7,649,278 B2 | 1/2010 | Yoshida et al. | |
| 8,052,293 B2 | 11/2011 | Hurwitz | |
| 8,203,454 B2 | 6/2012 | Knight et al. | |
| 8,214,105 B2 | 7/2012 | Daly et al. | |
| 8,222,799 B2 | 7/2012 | Polyakov et al. | |
| 8,237,324 B2 | 8/2012 | Pei et al. | |
| 8,269,731 B2 | 9/2012 | Molne | |
| 8,633,916 B2 | 1/2014 | Bernstein et al. | |
| 8,698,764 B1 | 4/2014 | Karakotsis | |
| 8,730,186 B2 | 5/2014 | Tamura et al. | |
| 8,948,944 B2 | 2/2015 | Kawashima | |
| 9,007,190 B2 | 4/2015 | Bosch et al. | |
| 9,244,562 B1 | 1/2016 | Rosenberg | |
| 9,513,707 B2 | 12/2016 | Lisseman et al. | |
| 9,696,223 B2 | 7/2017 | Lisseman et al. | |
| 9,727,031 B2 | 8/2017 | Lisseman et al. | |
| 9,829,980 B2 | 11/2017 | Lisseman et al. | |
| 2002/0041164 A1 | 4/2002 | Kim | |
| 2002/0054060 A1 | 5/2002 | Schena | |
| 2003/0043014 A1 | 3/2003 | Nakazawa et al. | |
| 2003/0076968 A1 | 4/2003 | Rast | |
| 2003/0083131 A1 | 5/2003 | Armstrong | |
| 2004/0195031 A1 | 10/2004 | Nagasaka | |
| 2004/0207605 A1 | 10/2004 | Mackey et al. | |
| 2005/0021190 A1 | 1/2005 | Worrell et al. | |
| 2005/0052426 A1 | 3/2005 | Hagermoser et al. | |
| 2005/0067889 A1 | 3/2005 | Chernoff | |
| 2005/0110769 A1 | 5/2005 | Dacosta et al. | |
| 2005/0156892 A1 | 7/2005 | Grant et al. | |
| 2005/0273218 A1 | 12/2005 | Breed et al. | |
| 2006/0025897 A1 | 2/2006 | Shostak et al. | |
| 2006/0054479 A1 | 3/2006 | Iisaka | |
| 2006/0076855 A1 | 4/2006 | Eriksen et al. | |
| 2006/0109256 A1* | 5/2006 | Grant ..................... G06F 3/016 |
| | | | 345/173 |
| 2006/0113880 A1 | 6/2006 | Pei et al. | |
| 2006/0177212 A1 | 8/2006 | Lamborghini et al. | |
| 2006/0248478 A1 | 11/2006 | Liau | |
| 2006/0262103 A1* | 11/2006 | Hu ........................ G06F 3/023 |
| | | | 345/173 |
| 2006/0284839 A1 | 12/2006 | Breed | |
| 2007/0062753 A1 | 3/2007 | Yoshida et al. | |
| 2007/0097073 A1 | 5/2007 | Takashima et al. | |
| 2007/0100523 A1 | 5/2007 | Trachte | |
| 2007/0120830 A1 | 5/2007 | Kaemmerer Bernhard et al. | |
| 2007/0287494 A1 | 12/2007 | You et al. | |
| 2008/0012837 A1 | 1/2008 | Marriott et al. | |
| 2008/0062145 A1 | 3/2008 | Shahoian | |
| 2008/0079604 A1 | 4/2008 | Madonna et al. | |
| 2008/0150911 A1 | 6/2008 | Harrison | |
| 2008/0202912 A1 | 8/2008 | Boddie et al. | |
| 2008/0230283 A1 | 9/2008 | Yoon | |
| 2008/0264183 A1 | 10/2008 | Graham et al. | |
| 2008/0289887 A1 | 11/2008 | Flint et al. | |
| 2009/0001855 A1 | 1/2009 | Lipton et al. | |
| 2009/0125811 A1 | 5/2009 | Bethurum | |
| 2009/0140994 A1 | 6/2009 | Tanaka | |
| 2009/0140996 A1 | 6/2009 | Takashima et al. | |
| 2009/0151447 A1 | 6/2009 | Jin et al. | |
| 2009/0153340 A1 | 6/2009 | Pinder et al. | |
| 2009/0160529 A1 | 6/2009 | Lamborghini | |
| 2009/0189749 A1 | 7/2009 | Salada et al. | |
| 2009/0228791 A1 | 9/2009 | Kim et al. | |
| 2009/0241378 A1 | 10/2009 | Ellis | |
| 2010/0001974 A1 | 1/2010 | Su et al. | |
| 2010/0045612 A1 | 2/2010 | Molne | |
| 2010/0053087 A1 | 3/2010 | Dai et al. | |
| 2010/0066512 A1 | 3/2010 | Rank | |
| 2010/0141606 A1 | 6/2010 | Bae et al. | |
| 2010/0168998 A1 | 7/2010 | Matsunaga | |
| 2010/0200375 A1 | 8/2010 | Han et al. | |
| 2010/0226075 A1 | 9/2010 | Jahge | |
| 2010/0236911 A1 | 9/2010 | Kim et al. | |
| 2010/0250066 A1 | 9/2010 | Eckstein et al. | |
| 2010/0250071 A1* | 9/2010 | Pala ........................ B60K 35/00 |
| | | | 701/48 |
| 2010/0268426 A1 | 10/2010 | Pathak et al. | |
| 2010/0302177 A1 | 12/2010 | Kim et al. | |
| 2010/0315267 A1 | 12/2010 | Chung et al. | |
| 2010/0321310 A1 | 12/2010 | Kim et al. | |
| 2010/0321335 A1 | 12/2010 | Lim et al. | |
| 2011/0037721 A1 | 2/2011 | Cranfill et al. | |
| 2011/0046788 A1 | 2/2011 | Daly et al. | |
| 2011/0054359 A1 | 3/2011 | Sazonov et al. | |
| 2011/0069021 A1 | 3/2011 | Hill | |
| 2011/0109552 A1 | 5/2011 | Yasutak et al. | |
| 2011/0141052 A1 | 6/2011 | Bernstein et al. | |
| 2011/0148608 A1 | 6/2011 | Grant | |
| 2011/0175844 A1 | 7/2011 | Berggren | |
| 2011/0205081 A1 | 8/2011 | Chen et al. | |
| 2011/0210926 A1 | 9/2011 | Pasquero et al. | |
| 2011/0216015 A1 | 9/2011 | Edwards | |
| 2011/0227872 A1 | 9/2011 | Huska et al. | |
| 2011/0241850 A1* | 10/2011 | Bosch .................... B60K 37/06 |
| | | | 340/384.6 |
| 2011/0245992 A1 | 10/2011 | Stahlin et al. | |
| 2011/0248728 A1 | 10/2011 | Maruyama et al. | |
| 2011/0255023 A1 | 10/2011 | Doyle et al. | |
| 2011/0260983 A1 | 10/2011 | Pertuit et al. | |
| 2011/0267181 A1 | 11/2011 | Kildal | |

(56) References Cited

U.S. PATENT DOCUMENTS

| | | |
|---|---|---|
| 2011/0279380 A1 | 11/2011 | Weber et al. |
| 2011/0290038 A1 | 12/2011 | Hoshino et al. |
| 2012/0013573 A1 | 1/2012 | Liu et al. |
| 2012/0038468 A1 | 2/2012 | Provancher |
| 2012/0039494 A1 | 2/2012 | Ellis |
| 2012/0062491 A1 | 3/2012 | Coni et al. |
| 2012/0105367 A1 | 5/2012 | Son et al. |
| 2012/0120009 A1 | 5/2012 | Lussey et al. |
| 2012/0126959 A1 | 5/2012 | Zarrabi et al. |
| 2012/0127115 A1 | 5/2012 | Gannon et al. |
| 2012/0169663 A1 | 7/2012 | Kim et al. |
| 2012/0223900 A1 | 9/2012 | Jiyama et al. |
| 2012/0229424 A1* | 9/2012 | Behles |
| 2012/0267221 A1 | 10/2012 | Gohng et al. |
| 2012/0267222 A1 | 10/2012 | Gohng et al. |
| 2012/0296528 A1 | 11/2012 | Wellhoefer et al. |
| 2012/0299856 A1 | 11/2012 | Hasui |
| 2013/0016053 A1 | 1/2013 | Jung et al. |
| 2013/0032002 A1 | 2/2013 | Kuntzel |
| 2013/0063380 A1 | 3/2013 | Wang et al. |
| 2013/0063389 A1 | 3/2013 | Moore et al. |
| 2013/0093679 A1 | 4/2013 | Dickinson et al. |
| 2013/0096849 A1 | 4/2013 | Campbell et al. |
| 2013/0100016 A1 | 4/2013 | Onodera |
| 2013/0106691 A1 | 5/2013 | Rank |
| 2013/0106700 A1 | 5/2013 | Sugiura et al. |
| 2013/0113715 A1 | 5/2013 | Grant et al. |
| 2013/0113717 A1 | 5/2013 | Van Eerd et al. |
| 2013/0122857 A1 | 5/2013 | Karaogu et al. |
| 2013/0128587 A1 | 5/2013 | Lisseman et al. |
| 2013/0141396 A1 | 6/2013 | Lapoe et al. |
| 2013/0147284 A1 | 6/2013 | Chun |
| 2013/0154938 A1 | 6/2013 | Arthur et al. |
| 2013/0181931 A1 | 7/2013 | Kinoshita |
| 2013/0222287 A1 | 8/2013 | Bae et al. |
| 2013/0222310 A1 | 8/2013 | Birnbaum et al. |
| 2013/0228023 A1 | 9/2013 | Drasnin et al. |
| 2013/0250213 A1 | 9/2013 | Tomomasa |
| 2013/0250502 A1 | 9/2013 | Tossavainen et al. |
| 2013/0250613 A1 | 9/2013 | Kamada |
| 2013/0307788 A1 | 11/2013 | Rao et al. |
| 2013/0338847 A1* | 12/2013 | Lisseman .......... H03K 17/9625 700/301 |
| 2013/0342337 A1 | 12/2013 | Kiefer et al. |
| 2014/0092025 A1* | 4/2014 | Pala .................. G06F 3/0414 345/173 |
| 2014/0114624 A1 | 4/2014 | Buchanan et al. |
| 2014/0191973 A1 | 7/2014 | Zellers et al. |
| 2014/0267076 A1 | 9/2014 | Birnbaum et al. |
| 2014/0267113 A1 | 9/2014 | Lisseman et al. |
| 2014/0267114 A1 | 9/2014 | Lisseman et al. |
| 2014/0347176 A1 | 11/2014 | Phan et al. |
| 2015/0009168 A1 | 1/2015 | Olien et al. |
| 2015/0046825 A1 | 2/2015 | Li |
| 2015/0097791 A1 | 4/2015 | Lisseman et al. |
| 2015/0097793 A1 | 4/2015 | Lisseman et al. |
| 2015/0097794 A1 | 4/2015 | Lisseman et al. |
| 2015/0116205 A1 | 4/2015 | Westerman et al. |
| 2015/0212571 A1 | 7/2015 | Kitada et al. |
| 2015/0309576 A1 | 10/2015 | Tissot |
| 2016/0103541 A1 | 4/2016 | Andrews et al. |
| 2016/0109949 A1 | 4/2016 | Park |
| 2016/0216764 A1 | 7/2016 | Kessler et al. |
| 2016/0342229 A1 | 11/2016 | Andrews et al. |
| 2017/0075424 A1 | 3/2017 | Bernstein et al. |

FOREIGN PATENT DOCUMENTS

| | | |
|---|---|---|
| JP | 06-037056 U | 5/1994 |
| JP | 2005-175815 | 6/2005 |
| JP | 2006-129893 | 5/2006 |
| JP | 200071809 | 3/2007 |
| JP | 2007-535019 A | 11/2007 |
| JP | 2008-181709 | 8/2008 |
| JP | 2009-008613 | 1/2009 |
| JP | 2009-521006 | 5/2009 |
| JP | 2009-186452 | 8/2009 |
| JP | 2009-244931 | 10/2009 |
| JP | 2010-511916 | 4/2010 |
| JP | 2011-008775 A | 1/2011 |
| JP | 20113188 | 1/2011 |
| JP | 2011-528826 A | 11/2011 |
| JP | 201273785 | 4/2012 |
| JP | 2012150833 | 8/2012 |
| JP | 2012176640 | 9/2012 |
| JP | 2013513865 | 4/2013 |
| JP | 2013-89117 A | 5/2013 |
| JP | 2013-098826 A | 5/2013 |
| JP | 2013-105192 A | 5/2013 |
| KR | 10-2006-0047110 | 5/2006 |
| KR | 100826532 | 5/2008 |
| KR | 10-2010-0129424 | 12/2010 |
| KR | 10-2011-0042924 | 4/2011 |
| WO | 2006123616 | 11/2006 |
| WO | 20010088935 | 8/2008 |
| WO | 2010009552 A1 | 1/2010 |
| WO | 20110008292 | 1/2011 |
| WO | 2011045929 | 4/2011 |
| WO | 2012052635 | 4/2012 |
| WO | 2012148010 | 11/2012 |
| WO | 20130082293 | 6/2013 |
| WO | 2016096700 A1 | 6/2016 |

OTHER PUBLICATIONS

International Search Report and Written Opinion issued in related International Application No. PCT/US2014/059652 dated Dec. 22, 2014.

International Search Report and Written Opinion issued in related International Application No. PCT/US2014/059673 dated Jan. 9, 2015.

International Search Report and Written Opinion issued in related International Application No. PCT/2014/059669 dated Jan. 23, 2015.

International Search Report and Written Opinion issued in related International Application No. PCT/US2014/059657 dated Feb. 16, 2015.

International Search Report and Written Opinion issued in related International Application No. PCT/US2014/059639 dated Feb. 24, 2015.

International Search Report and Written Opinion issued in related International Application No. PCT/US2014/040224 dated Sep. 24, 2014.

International Preliminary Report on Patentability, dated Dec. 10, 2015, received in connection with International Application No. PCT/US2014/040224.

International Preliminary Report on Patentability dated Apr. 12, 2016, received in connection with International Patent Application No. PCT/US2014/059639.

International Preliminary Report on Patentability dated Apr. 12, 2016, received in connection with International Patent Application No. PCT/US2014/059652.

International Preliminary Report on Patentability dated Apr. 12, 2016, received in connection with International Patent Application No. PCT/US2014/059657.

International Preliminary Report on Patentability dated Apr. 12, 2016, received in connection with International Patent Application No. PCT/US2014/059669.

International Preliminary Report on Patentability dated Apr. 12, 2016, received in connection with International Patent Application No. PCT/US2014/059673.

International Search Report and Written Opinion for International Patent Application No. PCT/US2013/030417, dated Jun. 21, 2013.

Notice of Allowance issued in related U.S. Appl. No. 14/291,845, dated Sep. 29, 2016.

Office Action issued in related U.S. Appl. No. 14/291,845, dated Sep. 24, 2015.

(56) References Cited

OTHER PUBLICATIONS

Office Action issued in related U.S. Appl. No. 14/291,845, dated Feb. 24, 2016.
Office Action issued in related U.S. Appl. No. 14/291,845, dated Feb. 3, 2017.
Office Action issued in related U.S. Appl. No. 13/673,463, dated Feb. 18, 2015.
Office Action issued in related U.S. Appl. No. 13/673,463, dated Aug. 20, 2015.
Office Action issued in related U.S. Appl. No. 13/673,463, dated Jan. 21, 2016.
Office Action issued in related U.S. Appl. No. 13/673,463, dated Aug. 24, 2016.
Office Action issued in U.S. Appl. No. 14/211,475, dated Dec. 17, 2015.
Co-pending U.S. Appl. No. 13/863,363, filed Apr. 15, 2013.
Office Action issued in U.S. Appl. No. 13/863,363, dated Nov. 10, 2015.
Office Action issued in U.S. Appl. No. 13/863,363, dated Jun. 3, 2016.
Office Action issued in U.S. Appl. No. 13/863,363, dated Nov. 3, 2016.
Notice of Allowance issued in U.S. Appl. No. 13/863,363, dated Apr. 7, 2017.
Office Action issued in U.S. Appl. No. 14/211,665, dated Dec. 15, 2015.
Non-Final Office Action issued in U.S. Appl. No. 14/291,845, dated Feb. 3, 2017.
Non-Final Office Action issued in U.S. Appl. No. 14/509,598, dated Jan. 6, 2017.
Office Action issued for Japanese Application No. 2016-517039, dated Mar. 5, 2019. Machine English Translation Included.
Office Action issued for Japanese Application No. 2016-517039, dated Jun. 26, 2018. Machine English Translation Included.
Office Action issued for Chinese Application No. 201480030786, dated Feb. 26, 2018. Machine English Translation Included.
Decision of Dismissal of Amendment issued for Japanese Patent Application No. 2016-517039, dated Oct. 29, 2019.
Office Action Issued for Japanese Application No. 2016-517039 dated May 19, 2020.

\* cited by examiner

| Force | System | Control Messages |
|---|---|---|
| First Threshold | HVAC | Turn on/off.<br>Adjust temperature.<br>Adjust fan speed.<br>Adjust mode (e.g., defrost, face and feet, just feet, etc.)<br>Adjust seat heat/ventilation.<br>Etc. |
| Second Threshold | Audio | Turn on/off.<br>Adjust sound level.<br>Adjust fade, balance, bass, treble, etc.<br>Adjust mode (e.g., radio, satellite radio, CD, auxiliary, etc.)<br>Etc. |
| Third Threshold | Windshield Wipers | Turn on/off.<br>Adjust speed/intermittent.<br>Spray/clean windows.<br>Turn on rear wipers (if equipped).<br>Etc. |
| Fourth Threshold | Cruise Control | Turn on/off.<br>Set speed.<br>Adjust speed.<br>Resume.<br>Etc. |
| Nth Threshold | Etc. | Etc. |

MULTI-DIMENSIONAL TRACKPAD

CROSS REFERENCE TO RELATED APPLICATIONS

This application is a continuation application of U.S. patent application Ser. No. 14/291,845 filed May 30, 2014, which will issue as U.S. Pat. No. 10,067,567 on Sep. 4, 2018, and which claimed priority to U.S. Provisional Patent Application No. 61/829,065 filed May 30, 2013 and entitled "Three Dimensional Trackpad," the contents of each are herein incorporated by reference in their entireties.

BACKGROUND

Conventional control systems present operators with a combination of controls such as switches, buttons, levers, knobs, dials, etc. The operators interact with these control systems by manipulating the presented controls in order to execute various control functions. Recently, control systems have become increasingly complex due to the growing number of controllable features. As control systems increase in complexity, control panels become cluttered with switches, buttons, levers, knobs and/or dials. Accordingly, the control systems become more difficult to operate. In addition, it becomes difficult for engineers to design control panels that are capable of accommodating all of the necessary controls within a confined space.

Track pad devices have been developed to address the problems in the related art. However, these devices are generally two-dimensional (X-Y). For example, some smart phone devices include optical track pads for navigating the graphical user interface (GUI) of the smart phone. The optical track pads have a pleasant tactile feel, provide an audible "tick" for each move and, unlike capacitive touch screens, can be used without direct skin contact. For example, capacitive touch screens do not work with gloves. Some optical track pads do work with gloves; however, because they use a mechanical contact that is separate from the track pad for accept or select functions. Furthermore, optical track pads generally have a fairly low resolution infrared camera susceptible to moisture (sweat) interferences and are limited to measurements in two (X-Y) dimensions.

SUMMARY

Embodiments of the present invention relate to force based track pads for human-machine interfaces (HMI) and in particular track pads capable of sensing forces as well as position and providing tactile and audible feedback.

Described herein is an embodiment of a method of controlling a system using a track pad. The exemplary method comprises a touch interface of a track pad receiving a touch force. The touch interface is positioned over an array of force sensors that are arranged to have a width and a length. The method further comprises passing at least a portion of the touch force through the touch interface to one or more force sensors of the array of force sensors. The one or more force sensors of the array of force sensors transmits the force information to a processor in communication with the array of force sensors The processor determines from the force information, a force position along the width and length and a corresponding force magnitude. The processor sends a control message to a system, wherein the control message is selected depending upon one or more of the force position along the width and length and the corresponding force magnitude. A feedback generator provides at least one of a tactile or audible feedback to the user of the track pad.

Also described herein is a track pad system that can be used to practice embodiments of the described method. In one aspect, the track pad system comprises a two-dimensional array of force sensors arranged to have a width and a length and a touch interface positioned over the array, wherein the touch interface passes touch forces through to one or more force sensors of the array of force sensors. A processor in communication with a memory executes computer-readable instructions stored on the memory, the instructions cause the processor to receive force information from the array of force sensors; and determine a force position along the width and length and a corresponding force magnitude. The track pad system is further comprised of a feedback generator that generates at least one of a tactile or audible feedback.

A track pad system integrated into a steering mechanism of a vehicle is also described herein. The system comprises a two-dimensional array of force sensors arranged to have a width and a length, the two dimensional array of force sensors embedded into a steering mechanism of a vehicle. The touch interface is positioned over the array, wherein the touch interface passes touch forces through to one or more force sensors of the array of force sensors. The system further comprises a processor in communication with a memory, wherein the processor executes computer-readable instructions stored on the memory, the instructions cause the processor to receive force information from the array of force sensors; determine a force position along the width and length and a corresponding force magnitude; and send a control message to a system, wherein the control message is selected from a plurality of control messages and the system is selected from a plurality of systems depending upon one or more of the force position along the width and length and the corresponding force magnitude.

It should be understood that the above-described subject matter may also be implemented as a computer-controlled apparatus (e.g., a human machine interface for a system), a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE SEVERAL VIEWS OF THE DRAWINGS

The components in the drawings are not necessarily to scale relative to each other and like reference numerals designate corresponding parts throughout the several views:

FIG. 4 is an illustration of a table that provides examples of systems that can be selected and control messages that can be sent to the selected system by an application of an embodiment of the present invention.

DETAILED DESCRIPTION

Figure 1:
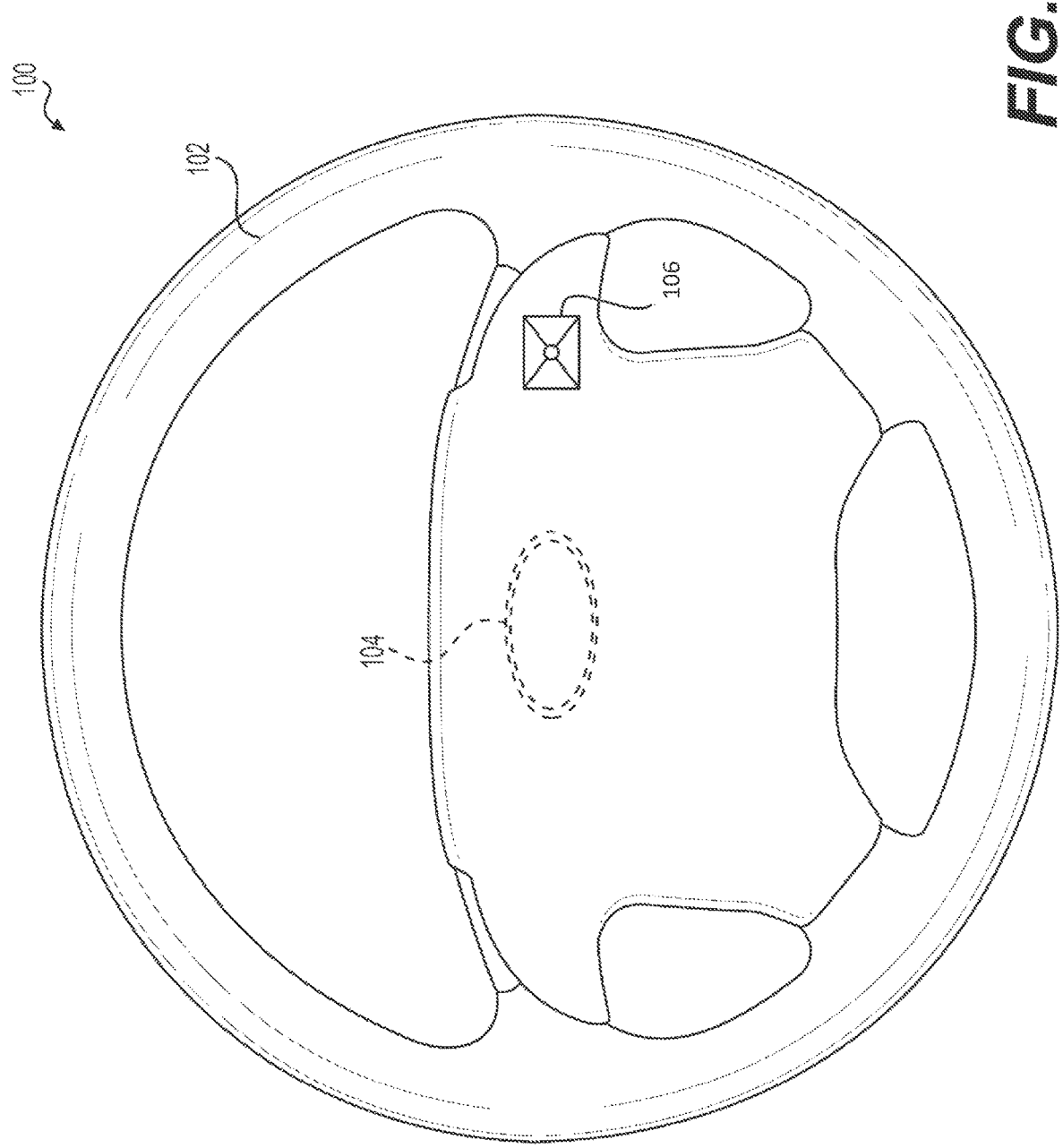
FIG. 1 illustrates a plan view of an exemplary steering apparatus implementing a force-based track pad interface for vehicle control panels in accordance with the present disclosure.

Described herein are embodiments of an invention that include a track pad system for recording multi-dimensional data including an X-Y direction and a force magnitude.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a plan view of an exemplary steering apparatus implementing a force-based track pad interface for vehicle control panels in accordance with the present disclosure. An example steering apparatus 100 can have a steering grip 102. A steering grip 102 can be shaped in such a way to facilitate a driver's control of a vehicle when holding the steering grip 102. For example, the steering grip 102 can include an annular ring shape with an outer contour that is essentially circular in shape. In an alternate implementation, the steering grip 102 can define any suitable shape including, for example, circular, elliptical, square, rectangular, or any other regular or irregular shape. In an exemplary implementation, the steering grip 102 can include a single continuous grip portion or any number of unique grip sections. Additionally the steering grip 102 can be mounted on a fixed component 104 such that it can be rotationally moved about a steering axis. An exemplary fixed component 104 can include, for example, a steering column, which receives a steering spindle that extends along the steering column and serves to transmit the rotational movement of the steering grip 102 to the wheels of the motor vehicle. Rotational movement of the steering grip 102 may be transmitted to the wheels by mechanical and/or electrical means. In an exemplary implementation, the steering apparatus 100 can also include a force-based track pad sensor 106, wherein the force-based track pad sensor 106 is operably coupled to the steering grip 102.

Coupling a force-based track pad sensor 106 to the steering grip 102 of a steering apparatus 100 provides a driver with a human-machine interface that can be configured to detect a touch or force provided by a user and determine if a switch function should or should not be activated. In one embodiment, the user can be provided with a tactile or audible feedback response.

A force-based track pad sensor 106 can be any sensor configured to change at least one electrical property in response to a touch or force applied to the sensor 106. A touch, also known as a touch event, can be for example a physical contact that occurs when a driver in a vehicle uses their hand (gloved or ungloved) to apply a force to force-based track pad sensor 106. A force-based track pad sensor 106, can be any suitable tactile sensor including, a mechanical sensor, a resistive sensor, a capacitive sensor, a magnetic sensor, an optical fiber sensor, a piezoelectric sensor, a silicon sensor, and/or a temperature sensor.

The force-based track pad sensor 106 can include a two-dimensional array of force sensors arranged to have a width and a length, where each force sensor includes conductors and electrodes and is in at least partial contact with a touch interface positioned over the array. In one embodiment the track pad sensor 106 can further comprise a base that is in at least partial contact with each of the force sensors. In one aspect, the base can comprise a printed circuit board. The touch interface passes touch forces to one or more force sensors of the array of force sensors. The touch interface can embody any touch-sensitive deformable member that can pass at least part of the forces from a user through the touch interface to one or more force sensors of the array of force sensors. In one embodiment, the touch interface can be used to provide haptic feedback to the user.

Figure 2:
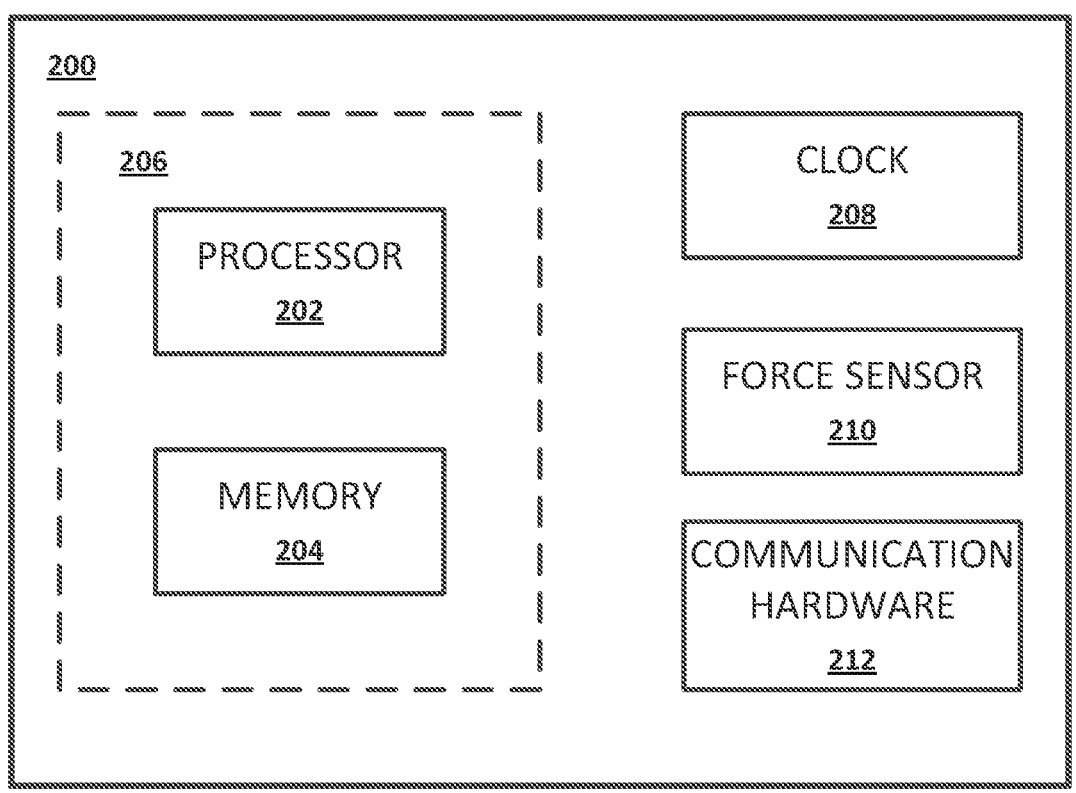
FIG. 2 illustrates a block diagram of a force-based track pad sensor system according to an implementation of the invention.

Referring to FIG. 2, a block diagram of a force-based track pad sensor system 200 according to an implementation of the invention is shown. The sensor system 200 is an example of a human machine interface for controlling a system as discussed in further detail below. The sensor system 200 may be used to sense a position and magnitude of force applied to the sensor system 200. In other words, the sensor system 200 may be configured to sense the position of the applied force in either one dimension (e.g., the X- or Y-direction) or two dimensions (e.g., the X- and Y-directions), as well of as the magnitude of the applied force (e.g., force in the Z-direction). The sensor system 200 can also be configured to sense the time that a force is applied at a particular location. The sensor system 200 may include a computing unit 206, a system clock 208, one or more force sensors 210 and communication hardware 212. In its most basic form, the computing unit 206 may include a processor 202 and a system memory 204. The processor 202 may be a standard programmable processor that performs arithmetic and logic operations necessary for operation of the sensor system 200. The processor 202 may be configured to execute program code encoded in tangible, computer-readable media. For example, the processor 202 may execute program code stored in the system memory 204, which may be volatile or non-volatile memory. The system memory 204 is only one example of tangible, computer-readable media. In one aspect, the computing unit 206 can be considered an integrated device such as firmware. Other examples of tangible, computer-readable media include floppy disks, CD-ROMs, DVDs, hard drives, flash memory, or any other machine-readable storage media, wherein when the program code is loaded into and executed by a machine, such as the processor 202, the machine becomes an apparatus for practicing the disclosed subject matter.

In addition, the sensor system 200 may include one or more force sensors 210 that can change at least one electrical property (e.g., resistance) in response to forces applied to the sensor system 200. The force sensor 210 is an example of a pressure sensitive input device as discussed in further detail below. Further, the sensor system 200 may include communication hardware 212 that interfaces with the force sensor 210 and receives/measures the sensed changes in the at least one electrical property of the force sensor 210. Additionally, the sensor system 200 may include a system clock 208. The processor 202 may be configured to associate the sensed changes in the at least one electrical property of the force sensor 210 with a time from the system clock 208 and store the sensed changes and corresponding time to the system memory 204. Optionally, the processor 202 may be configured to analyze the stored data and associate measured changes in the at least one electrical property of the force sensor 210 with various control messages for controlling system functions.

Figure 3A:
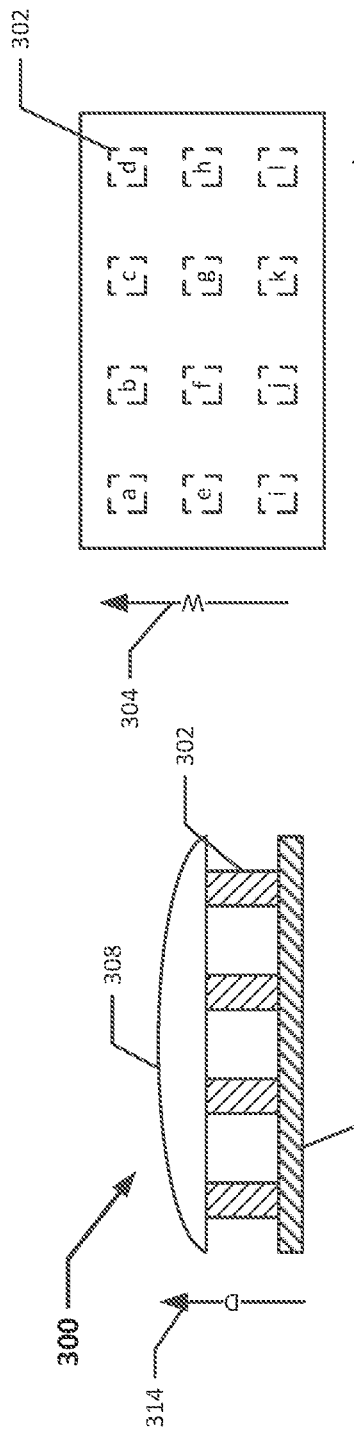
FIGS. 3A and 3B illustrate a cross-sectional view and a plan view of an embodiment of a force-based track pad.
Figure 3B:

FIGS. 3A and 3B illustrate a cross-sectional view and a plan view of an embodiment of a force-based track pad 300. This embodiment of a force-based track pad 300 includes a two-dimensional array of force sensors 302 arranged to have a geometric shape having a width 304 and a length 306. For example, the array of force sensors 302 may have a width 304 or length 306 that is 8 mm or larger. In another example, the array of force sensors 302 may have a width 304 or length 306 that is less than 8 mm. In one embodiment, the track pad 300 can have a depth 314 that is 0.5 mm or less. In another example, the track pad 300 can have a depth 314 that is greater than 0.5 mm. While shown in FIGS. 3A and 3B as having a rectangular shape, it is to be appreciated that this is for illustrative purposes only and the two-dimensional array of force sensors 302 can have shapes such as circular, oval, square, rectangular, triangular and irregular shapes. Further comprising the embodiment of a force-based track pad 300 as shown in FIGS. 3A and 3B is a touch interface 308 positioned over the array of force sensors 302, wherein the touch interface 308 passes touch forces through to one or more force sensors 302 of the array of force sensors 302. As described herein, the touch interface 308 can embody any touch-sensitive deformable member that can pass at least part of the forces from a user through the touch interface 308 to one or more force sensors 302 of the array of force sensors 302. For example, the touch interface 308 can be comprised of rubber, plastics, flexible metals, leather, and the like including combinations thereof. Generally, the force sensors 302 are connected to or integrated with a base 310. For example, the base 310 can comprise a printed circuit board (PCB) used to electronically communicate information or power to and from the force sensors 302 in the form of electrical signals. In various embodiments, the base 310 can further comprise electronic circuit components such as resistors, capacitors, diodes, LEDs, transmitters, receivers, and the like. In one embodiment, the base 310 is used to electrically connect the force sensors 302 with a processor 202, as described herein.

The force sensors 302 are arranged such that the position of a force on the touch interface 308 can be detected by one or more of the force sensors 302 of the array of force sensors 302. In this manner, by the force sensors 302 affected by the force on the touch interface 308 and the magnitude of the force on each of the affected force sensors 302, the position (X, Y) of the force on the touch interface 308 can be determined. For example, force information from the array of force sensors can be transmitted to a processor such as the processor 202 shown in FIG. 2 and described herein. The processor 202 can be in communication with a memory 204, wherein the processor 202 executes computer-readable instructions stored on the memory 204. The instructions can cause the processor 202 to receive the force information from the array of force sensors 302 and determine a force position along the width 304 and length 306 and a corresponding force magnitude. The force information can be transmitted from the array of force sensors 302 to the processor 202 via a wired connection (including fiber optics, wirelessly (RF using protocols such as Bluetooth™, WiFi (IEEE 802.11n), etc.), or combinations thereof. For example, referring now to FIG. 3B, the processor can receive force information from force sensors c, d, g, and h. By having the location of these force sensors 302 programmed into its memory 204, the processor 202 can determine that a force is being applied to the upper right-hand quadrant of the force-based track pad 300. By determining the magnitude of the force being applied to the force sensors 302, the processor 202 can be programmed via instructions from the memory 204 to further refine the location of the force and to take specific actions based on any of the location of the force on the track pad 300, the magnitude of the force applied to the track pad 300, the time the force is applied to the track pad 300, the change of the location of the applied force to the track pad 300, the rate of the change of the location of the applied force to the track pad 300 (e.g., quickly swiping a thumb across the track pad 300 results in one action being taken while slowly swiping the thumb across the track pad 300 results in a different action being taken), the direction of the change of the location of the applied force to the track pad 300, the length from a first touch point to a second touch point on the track pad 300, the length or distance that a digit is moved across the track pad 300 after a first touch point, the direction that a digit is moved across the track pad 300 after a first touch point, changes in the magnitude of the force applied to the track pad 300, rate of change in the magnitude of the force applied to the track pad 300, combinations of any of the above, and the like.

Referring back to FIG. 3A, the force sensors 302 can be any device or structure that can transform force into a signal. The signal can be electrical, electronic (digital or analog), mechanical, or optical. For example, in one embodiment the force sensors are microelectromechanical systems (MEMS) sensors. In one embodiment, the MEMS sensors are structure-based piezo-resistive sensors.

Figure 3C:
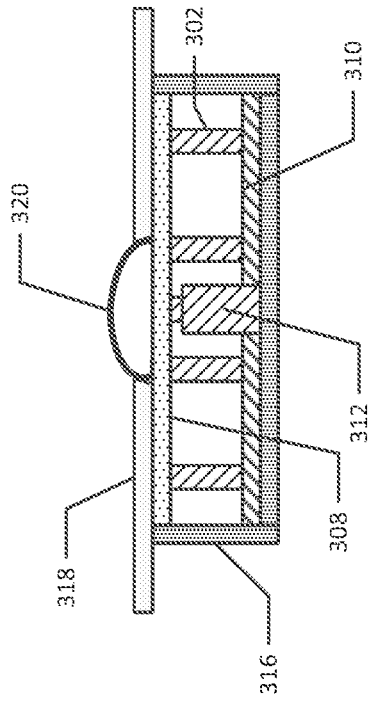
FIG. 3C illustrates another embodiment of a force-based track pad that further comprises a feedback generator that generates at least one of a tactile or audible feedback.

FIG. 3C illustrates another embodiment of a force-based track pad 300 that further comprises a feedback generator 312 that generates at least one of a tactile or audible feedback. In one aspect, the tactile or audible feedback provided by the feedback generator 312 is proportional to at least one of the force position and the force magnitude. For example, the tactile or audible feedback can get stronger or louder as greater force is applied to the track pad 300. Similarly, the tactile or audible feedback can get stronger or louder depending upon the location on the track pad 300 where the force is applied. The feedback generator 312 may, in some embodiments, be controlled by the processor 202. For example, the processor 202 may determine the location or magnitude of the force applied to the track pad 300, as described herein, and then cause the feedback generator 312 to generate the tactile or audible feedback that is proportional to at least one of the force position and the force magnitude. Software stored in the memory 204 can cause the processor 202 to perform these functions. In one embodiment, the feedback generator 312 can be integrated into the structure that comprises the force-based track pad 300. For example, in one embodiment the feedback generator 312 can be integrated into the base 310. In another embodiment, feedback generator 312 is a structural part of the structure-based piezo-resistive sensors, as described herein. In yet another embodiment, the feedback generator 312 is a haptic generator used to generate the tactile and audible feedback. In one embodiment, the haptic generator can be a coneless coil and magnet assembly such as that described in U.S. Pat. App. Pub. No. 2012/0039494 entitled "LOUDSPEAKERS" and filed on Feb. 16, 2010, which is fully incorporated herein by reference and made a part hereof.

The embodiments of a force-based track pad 300 described herein can be used to control one or more systems. For example, embodiments of a force-based track pad 300 described herein can be used to control the systems of a vehicle such as environmental (HVAC), audio, telephone, cruise control, windshield wipers, lighting, window and mirrors, and the like. For example, instructions stored in the memory 204 can further cause the processor 202 to send a control message to a system selected from a plurality of systems, wherein the control message is selected from a plurality of control messages by the processor 202. The selection of system and control message can be made depending upon one or more of the force position along the width and length and the corresponding force magnitude. For example, in one embodiment the system can be selected from the plurality of systems depending upon the force magnitude and the control message is selected from the plurality of control messages depending at least partially upon the force position along the width and length. Consider this example, the force-based track pad 300 can have a plurality of force thresholds that can be used to select the system from the plurality of systems. For example, the force-based track pad 300 can have at least three thresholds that correlate to a different system for each threshold. In one example, the force thresholds are in increments of one Newton (N) or one ounce, two N or two ounces, and the like. For example, the first threshold may be at a force of one Newton (N) or one ounce and correlate to the audio system of a vehicle. The second threshold can be at two N or two ounces of force that correlates to the HVAC system for the vehicle. The third threshold can be at three N or three ounces of force that correlates to the cruise control system for the vehicle. In other words, the track pad 300 can recognize force magnitude of at least three thresholds and the system is selected from the plurality of systems depending upon the force magnitude exceeding one or more of the thresholds.

In one embodiment, once the system is selected from the plurality of systems based on the force magnitude, a control message for sending to that selected system can be selected from a plurality of control messages based at least in part on the force position along the width and length of the track pad 300. For example, if the HVAC system is selected based on the force magnitude, then a control message such as turn on/off the heat, turn up/down the fan, adjust the temperature, etc., can be selected based at least in part on the force position along the width and length of the track pad 300. For example, control messages to send to the selected system can be selected based on one or more of the time the force is applied to the track pad 300 at a certain location, the change of the location of the applied force to the track pad 300, the rate of the change of the location of the applied force to the track pad 300 (e.g., quickly swiping a thumb across the track pad results in one action being taken while slowly swiping the thumb across the track pad 300 results in a different action being taken), the direction of the change of the location of the applied force to the track pad 300, the length from a first touch point to a second touch point on the track pad 300, the length or distance that a digit is moved across the track pad 300 after a first touch point, the direction that a digit is moved across the track pad 300 after a first touch point, changes in the magnitude of the force applied to the track pad 300, changes in the magnitude of the force applied to the track pad 300, rate of change in the magnitude of the force applied to the track pad 300, combinations of any of the above, and the like.

In one embodiment, the feedback generator 312 can provide an audible tick or other sound when the control message is selected from the plurality of control messages depending at least partially upon the force position along the width and length and provide the tactile feedback for each selection made depending on the force magnitude. Alternatively, the feedback generator 312 can provide an audible tick for each selection made depending on the force magnitude and provide tactile feedback when the control message is selected from the plurality of control messages depending at least partially upon the force position along the width and length of the track pad 300.

Figure 3D:
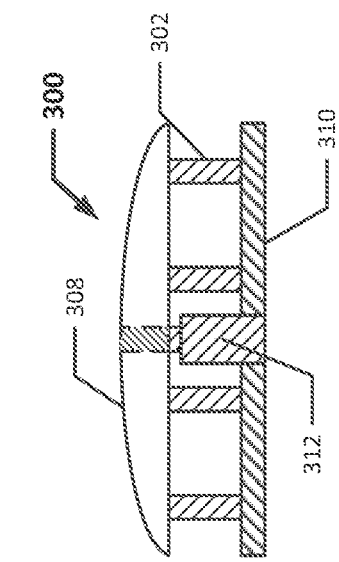
FIG. 3D is an illustration of a cross-sectional view of yet another embodiment of a force-based track pad.

FIG. 3D is a cross-sectional view of yet another embodiment of a force-based track pad 300. This embodiment includes the two-dimensional array of force sensors 302 arranged to have a geometric shape having a width 304 and a length 306, a touch interface 308 positioned over the array of force sensors 302, wherein the touch interface 308 passes touch forces through to one or more force sensors 302 of the array of force sensors 302, a base 310, and a feedback generator 312 that generates at least one of a tactile or audible feedback. Further comprising the embodiment shown in FIG. 3D is an enclosure 316 that encloses the components of the track pad 300. The enclosure 316 can be comprised of any suitable material such as plastics, metals, and the like. It can be used to add structural integrity to the track pad 300 as well as to protect it from physical and/or environmental damage or contamination. The enclosure 316 may also facilitate manufacturing, installation or removal of the track pad 300. Further illustrated in FIG. 3D is an interchangeable overlay 320 so that different materials, colors, textures can be used for the track pad 300, which can be used for an aesthetic effect of a larger device, such as a vehicle, where the track pad 300 is installed. This can also allow replacement of the overlay 320 if it becomes damaged, dirty or worn. Also shown in FIG. 3D, but not required, is the trim 318 of a larger device, such as a vehicle, where the track pad 300 is installed. For example, the trim 318 can be a part of the steering apparatus 100 shown in FIG. 1.

As noted herein, the force-based track pad can be used to select and control a plurality of systems. The table 400 of FIG. 4 illustrates examples of systems that can be selected and control messages that can be sent to the selected system. For example, the force-based track pad 300 can have a plurality of thresholds that correlate to a different system for each threshold. In one example application of an embodiment of the invention, as shown in the table 400 of FIG. 4, the first threshold may correlate with the HVAC system for a vehicle. By selecting the first threshold by applying a defined amount of force (e.g., one N or one ounce) to the track pad 300 (either momentarily or for a defined period of time), the HVAC system can be selected and controlled using the track pad 300. Once selected by the force applied to the track pad 300, the track pad 300 can be used to select and send control messages to the HVAC system. Gestures or other actions using the track pad 300 that are at least partially dependent upon the position along the width and length of the track pad 300 can be used to send the control messages to the HVAC system. For example, control messages to send to the selected system can be selected based on one or more of the time the force is applied to the track pad 300 at a certain location, the change of the location of the applied force to the track pad 300, the rate of the change of the location of the applied force to the track pad 300 (e.g., quickly swiping a thumb across the track pad results in one action being taken while slowly swiping the thumb across the track pad 300 results in a different action being taken), the direction of the change of the location of the applied force to the track pad 300, the length from a first touch point to a second touch point on the track pad 300, the length or distance that a digit is moved across the track pad 300 after a first touch point, the direction that a digit is moved across the track pad 300 after a first touch point, changes in the magnitude of the force applied to the track pad 300, changes in the magnitude of the force applied to the track pad 300, rate of change in the magnitude of the force applied to the track pad 300, combinations of any of the above, and the like. For the exemplary HVAC system that has been selected, such control messages can include for example: Turn on/off; Adjust temperature; Adjust fan speed; Adjust mode (e.g., defrost, face and feet, just feet, etc.); Adjust seat heat/ventilation; and the like.

Similarly, a second force threshold can be correlated with a second system, such as an audio system of a vehicle. In one embodiment, the second threshold is at a force greater than the first threshold. In another embodiment, the second threshold can be at a force less than the first threshold. Similar to the above, once the audio system is selected using force on the track pad 300, control messages can be sent to the audio system using gestures or other actions using the track pad 300 that are at least partially dependent upon the position along the width and length of the track pad 300. For the audio system such messages can be, for example: Turn on/off; Adjust sound level; Adjust fade, balance, bass, treble, etc.; Adjust mode (e.g., radio, satellite radio, CD, auxiliary, etc.); and the like. Other systems, such as those shown in FIG. 4, can be selected and controlled in similar fashion.

The track pad system 300 disclosed herein may be particularly applicable to distracted environments, such as in automobile operation, wherein the human needs additional feedback to properly operate a machine. For example, the driver of an automobile is usually best visually focused on his or her surroundings during the driving task. The ability of the track pad system 300 to provide haptic and audible feedback makes for more sure and satisfying operation of various automobile systems. As described herein, the track pad system 300 may be used, for example, to operate stereo and/or climate controls. Each change of a station or degree could generate haptic and audible feedback. In addition, the provision of force sensitivity—and in particular thresholds—allows multiple layers of functionality from a single button. The advantage of this implementation is that the track pad 300 can replace a large number of controls and shrink the necessary reach range (and the amount of distraction) for the driver.

Figure 5:
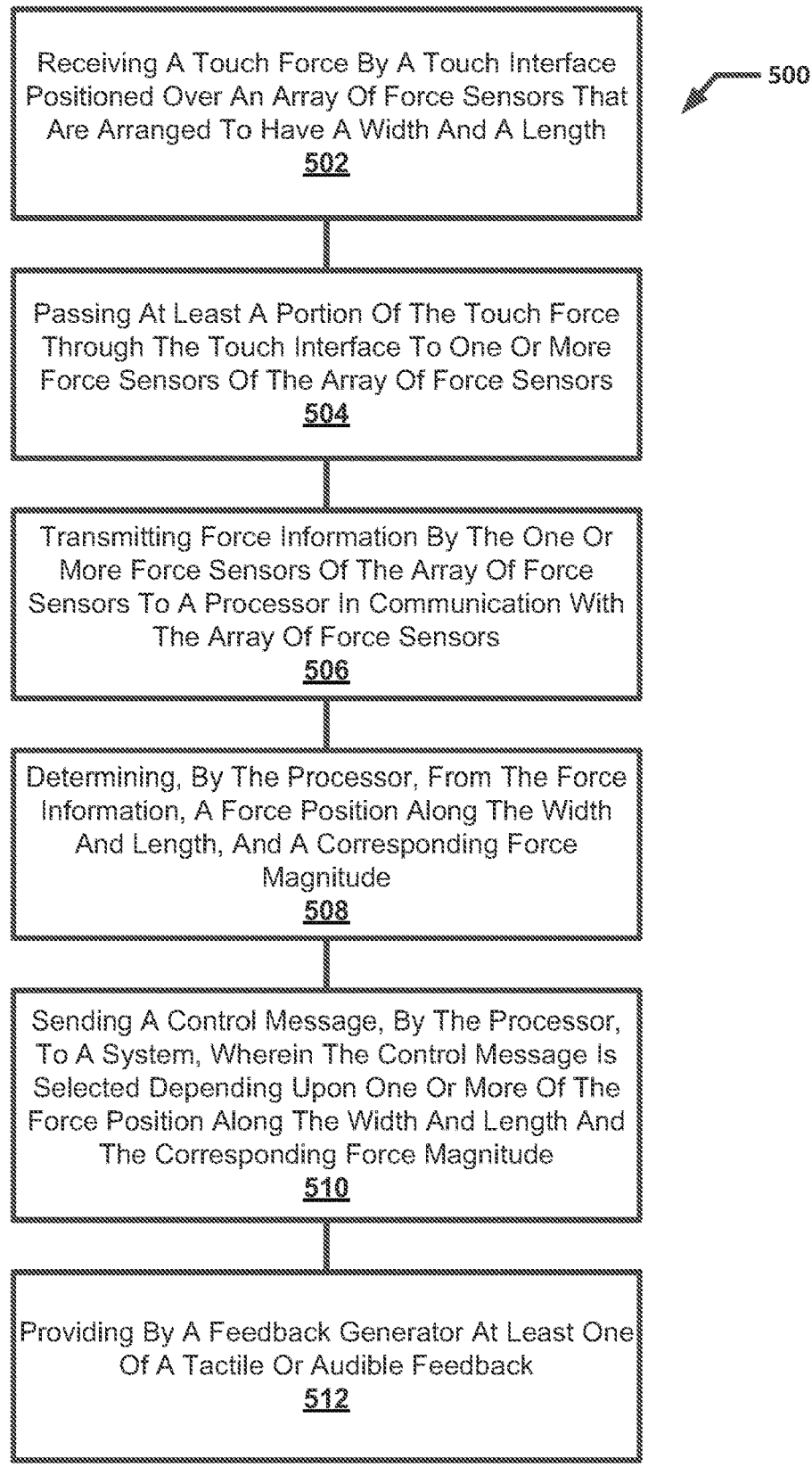
FIG. 5 is an exemplary flowchart that can be used to describe a method of controlling a system using a track pad.

FIG. 5 is an exemplary flowchart 500 that can be used to describe a method of controlling a system using a track pad. Steps of the method comprise Step 502, receiving a touch force by a touch interface 308 positioned over an array of force sensors 302 that are arranged to have a width 304 and a length 306. At Step 504, passing at least a portion of the touch force through the touch interface 308 to one or more force sensors 302 of the array of force sensors 302. At Step 506, transmitting force information by the one or more force sensors 302 of the array of force sensors 302, to a processor 202 in communication with the array of force sensors 302. At Step 508, determining, by the processor, from the force information, a force position along the width 304 and length 306, and a corresponding force magnitude. At Step 510, the processor sends a control message to a system, wherein the control message is selected depending upon one or more of the force position along the width 304 and length 306 and the corresponding force magnitude. In one aspect, as described herein, sending the control message to the system, wherein the control message is selected depending upon one or more of the force position along the width and length and the corresponding force magnitude, further comprises selecting the system from a plurality of systems and selecting the control message from a plurality of control messages, the selections made depending upon one or more of the force position along the width and length and the corresponding force magnitude. In one embodiment, the system is selected from the plurality of systems depending upon the force magnitude and the control message is selected from the plurality of control messages depending at least partially upon the force position along the width and length. For example, the force magnitude can have at least three thresholds and the system is selected from the plurality of systems depending upon the force magnitude exceeding one or more of the thresholds. In one aspect, a different system is selected for each threshold. In another embodiment, the control message is selected depending upon the force magnitude exceeding a threshold, wherein the force magnitude has at least three thresholds and the control message is selected depending upon the force magnitude exceeding one or more of the thresholds. In one aspect, a different control message is selected for each threshold. At Step 512, a feedback generator provides at least one of a tactile or audible feedback. In one aspect, the feedback generator provides a tactile or audible feedback that is proportional to at least one of the force position and the force magnitude. For example, the feedback may get louder, more frequent, more powerful, quieter, less powerful, etc. depending upon the force applied to the track pad 300 or at least partially upon the force position. In one embodiment, the feedback generator can be configured to provide an audible tick or other sound when the control message is selected from the plurality of control messages depending at least partially upon the force position along the width and length and provide the tactile feedback for each selection made depending on the force magnitude.

The flowchart and block diagrams in the figures illustrate the architecture, functionality, and operation of possible implementations of systems, methods and computer program products according to various implementations of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

What is claimed is:

1. A method of selecting and controlling a system using a track pad, the method comprising:

providing the track pad integrated into a steering mechanism of a vehicle, said track pad comprising at least a touch interface positioned over an array of force sensors that are arranged to have a width and a length, and wherein said track pad is not associated with a display;

receiving, by the track pad, a touch force, wherein said touch force comprises a first touch with the touch interface of the track pad to control the system from among a plurality of systems of the vehicle;

passing at least a portion of said touch force through the touch interface to one or more force sensors of the array of force sensors;

transmitting, by the one or more force sensors of the array of force sensors, force information of the first touch to a processor in communication with the array of force sensors;

determining, by the processor, from the force information of the first touch a force position of the first touch along the width and length and a force magnitude of the first touch;

selecting, by the processor and based on the first touch, the vehicle system to control from among the plurality of systems of the vehicle, wherein each of the plurality of vehicle systems has a corresponding force threshold such that the vehicle system is selected from among the plurality of systems of the vehicle based on the force magnitude of the first touch and the force position of the first touch along the width and the length;

selecting, by the processor, a control message from among a plurality of control messages to send to the selected system based on one or more of a time the touch force of the first touch is applied to the track pad at the force position, a change of the touch force from the first position to a second location on the track pad, a rate of change of the touch force from the first position to the second location on the track pad, a direction of the change of the touch force from the first position to the second location on the track pad, a length from the first position to the second location of the touch force, a change in the force magnitude of the touch force, and a rate of change of the force magnitude of the touch force; and sending, by the processor, the selected control message to the selected system.

2. The method of claim 1, wherein the track pad has at least two thresholds and a first system is selected from the plurality of systems when the touch force has a force magnitude that exceeds a first threshold of the at least two thresholds and a second system is selected from the plurality of systems when the touch force has a force magnitude that exceeds a second threshold of the at least two thresholds.

3. The method of claim 1, wherein the rate of change of the touch force from the first position to the second location on the track pad comprises a person swiping a digit across the track pad and a first rate of change results in selection of a first control message while a second rate of change results in selection of a second control message.

4. The method of claim 3, wherein the first control message and the second control message are not a same control message.

5. The method of claim 1, further comprising providing, by a feedback generator, at least one of a tactile or audible feedback.

6. The method of claim 5, wherein providing, by the feedback generator, at least one of a tactile or audible feedback, comprises the feedback generator providing tactile or audible feedback that is selected based on the force position of the first touch along the width and length or the force magnitude of the first touch.

7. The method of claim 1, further comprising installing an interchangeable overlay on the track pad, wherein the interchangeable overlay provides an aesthetic effect to the track pad.

8. A system for selecting and controlling a vehicle system selected from a plurality of vehicle systems using a track pad, the system comprising:
the track pad integrated into a steering mechanism of a vehicle and comprised of a two-dimensional array of force sensors arranged to have a width and a length and a touch interface positioned over the array, wherein the touch interface passes touch forces through to one or more force sensors of the array of force sensors and said track pad is not associated with a display;
a processor in communication with the array of force sensors and with a memory, wherein the processor executes computer-readable instructions stored on the memory, said instructions cause the processor to:
receive force information from the array of force sensors from a touch force, wherein said touch force is caused by a first touch with the touch interface of the track pad to control the vehicle system from among the plurality of systems of the vehicle;
determine a force position of the first touch along the width and length and a force magnitude of the first touch;
select, based on the first touch, the vehicle system to control from among the plurality of systems of the vehicle, wherein each of the plurality of vehicle systems has a corresponding force threshold such that the vehicle system is selected from among the plurality of systems of the vehicle based on the force magnitude of the first touch and the force position of the first touch along the width and the length;
select a control message from among a plurality of control messages to send to the selected system based on one or more of a time the touch force of the first touch is applied to the track pad at the force position, a change of the touch force from the first position to a second location on the track pad, a rate of change of the touch force from the first position to the second location on the track pad, a direction of the change of the touch force from the first position to the second location on the track pad, a length from the first position to the second location of the touch force, a change in the force magnitude of the touch force, and a rate of change of the force magnitude of the touch force; and
send the selected control message to the selected system.

9. The system of claim 8, wherein the track pad has at least two thresholds and a first system is selected from the plurality of systems when the touch force of the first touch has a force magnitude exceeds a first threshold of the at least two thresholds and a second system is selected from the plurality of systems when the touch force of the first touch has a force magnitude exceeds a second threshold of the at least two thresholds.

10. The system of claim 8, wherein the rate of change of the force touch from the first position to the second location on the track pad comprises a person swiping a digit across the track pad and a first rate of change results in selection of a first control message while a second rate of change results in selection of a second control message.

11. The system of claim 10, wherein the first control message and the second control message are not a same control message.

12. The system of claim 8, further comprising a feedback generator, wherein the feedback generator provides at least one of a tactile or audible feedback.

13. The system of claim 12, wherein providing, by the feedback generator, at least one of a tactile or audible feedback, comprises the feedback generator providing tactile or audible feedback that is selected based on the force position of the first touch along the width and length or proportional to the force magnitude of the first touch.

14. The system of claim 8, wherein the track pad further comprises an interchangeable overlay on the track pad, wherein the interchangeable overlay provides an aesthetic effect to the track pad.

* * * * *